McMahon

[11] 3,743,379
[45] July 3, 1973

[54] LIGHT DEFLECTOR APPARATUS
[75] Inventor: Donald H. McMahon, Carlisle, Mass.
[73] Assignee: Sperry Rand Corporation, New York, N.Y.
[22] Filed: Sept. 7, 1971
[21] Appl. No.: 178,228

[52] U.S. Cl.................. 350/150, 350/157, 350/160, 350/DIG. 2
[51] Int. Cl. ............................................ G02f 1/26
[58] Field of Search.................... 350/147, 150, 157, 350/160, DIG. 2

[56] References Cited
UNITED STATES PATENTS

| 3,624,817 | 11/1971 | Lee et al. | 350/150 |
| 3,515,455 | 6/1970 | Kompfner | 350/DIG. 2 |
| 3,604,782 | 9/1971 | Dore | 350/150 |
| 3,485,553 | 12/1969 | Lee | 350/DIG. 2 |

Primary Examiner—Ronald L. Wibert
Assistant Examiner—Michael J. Tokar
Attorney—S. C. Yeaton

[57] ABSTRACT

A light deflector apparatus comprising a lens array positioned between first and second identical light deflector stages. Inclusion of the lens array provides for the number of resolvable beam positions to be equal to the product rather than the sum of the resolvable positions of the deflector stages. The first light deflector stage controllably deflects an incident light beam along one of a plurality of discrete directions to impinge on respective lenses of the array which in turn direct the beam onto the second light deflector stage with an angular separation between resolvable beam positions equal to the full angular deflection range of the deflector stages. The second deflection stage then fills in the voids produced by the lens array by controllably deflecting the beam to a desired position among respective pluralities of discrete positions corresponding to each angular direction of the beam incident on the second deflector.

5 Claims, 1 Drawing Figure

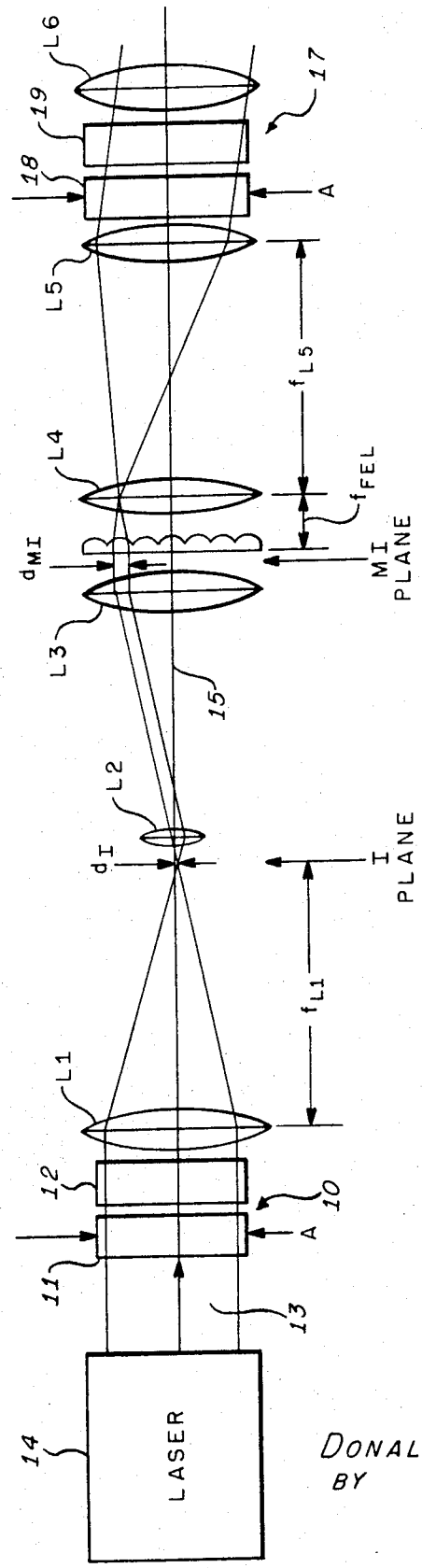

3,743,379

LIGHT DEFLECTOR APPARATUS

BACKGROUND OF THE INVENTION

1. Field of the Invention

The present invention relates generally to controllable light deflector apparatus, as used for example in random access optical memory systems, and more particularly to improvements for enhancing resolution and significantly reducing the size and complexity of such apparatus.

2. Description of the Prior Art

Controllable light deflectors incorporating various light deflecting components such as movable mirrors, acousto-optic lines, and electro-optic prism assemblies have been under serious investigation by researchers in the art for the past several years. Digital and analog operated electro-optic assemblies wherein the beam deflection is determined by the refractive index properties of the deflector material and the polarization characteristic of the light have been of particular interest. A digital light deflector typically comprises a plurality of cascaded electro-optic stages which are selectively energizable so as to permit the beam either to pass unaffected or be deflected a predetermined amount as desired in accordance with the polarization orientation of the light propagating through respective birefringent components comprising the various stages. Each stage is operative to deflect the beam an amount substantially double that of the immediately preceding stage in the usual binary fashion whereby the number of resolvable beam positions is proportional to the number of stages (N); or, more precisely, the number of discrete beam positions is equal to $2^N$. Thus, an extremely large number of discrete beam positions can be attained by the provision of an appropriate number of stages. But in systems where hundreds of thousands or more resolvable positions are desired, an impractically large number of stages will be required with the attendant disadvantages of complexity and high cost along with hisgh power comsunption and high light losses.

Analog-type electro-optic deflectors are obtained simply by arranging for a light beam of prescribed polarization orientation to propagate through an assembly comprising a lineal array of prism or wedge-shaped sections of birefringent material having their index axes appropriately aligned relative to the light polarization. The light is deflected or continuously scanned to any point along a given line, or given plane in the case of a two-dimensional scanner, in proportion to the magnitude of the voltage applied to the prism assembly. A device of this sort can also be operated in a digital manner for deflecting the light beam to discrete points simply by changing the applied voltage amplitude in prescribed increments. A multi-position deflector of this type though is capable of deflecting the beam to only a comparatively small number of positions, on the order of 100 or so with presently available materials; and, for various practical reasons, probably only about one-third that amount. Consequently, it is also necessary to cascade these multi-position deflectors in order to achieve a practical number of beam positions. Unfortunately, however, in a cascaded arrangement of such deflectors, many of the beam positions will be redundant. Consider, for example, a device including two cascaded stages each capable of deflecting a beam to any one of 30 discrete lineally arrayed positions. Energization of either the first or second stage will cause the beam to deflect to any of positions 1 to 30 depending on the amplitude of the applied excitation while energization of both stages simultaneously will enable 30 additional beam positions to be attained. In other words, the number of discrete beam positions will be equal to the sum of the positions attainable with the individual stages and as a result an impractically large number of cells will again be required to construct a suitable beam deflector apparatus.

The above-described limitations presented a serious obstacle to the development of a practical large capacity deflector. Recently, however, within the past few years it has been disclosed in the art that capacity can be significantly increased by the provision of a prism array disposed intermediate successive deflector stages, an individual prism being located in the path of each resolvable beam provided by the first deflector stage. Each prism operates to refract a beam incident thereon to provide a larger angular separation between resolvable beam positions. The second deflector stage, in turn, controls the beam deflection so as to fill the voids produced by the prism assembly. With apparatus constructed in this manner, the number of resolvable beam positions becomes equal to the product, rather than the sum, of the number of positions obtainable with the individual deflector stages. Thus, in the case of two 30position deflector stages, a total of 30 × 30 or 900 discrete lineal positions is attainable while for three cascaded stages the capacity is increased to 27,000 lineal positions. Likewise, in the case of a two-dimensional deflector incorporating two deflector stages each including a horizontal and a vertical deflection cell, the capacity approaches 1,000,000 resolvable positions.

While the foregoing comments have been made with respect to a deflector apparatus incorporating electro-optic type multi-position deflector stages, it should be understood that the inventive technique described herein is applicable to any type of multi-position deflector stage such as an acousto-optic line, piezoelectrically driven elements, a cascaded arrangement of binary operated cells, or mechanically actuated components, although in general electrically controllable devices are preferred for their relative simplicity and high speed operational capability.

SUMMARY OF THE INVENTION

A preferred embodiment of the present invention comprises a two-dimensional lens array disposed between first and second identical multi-position deflector stages which are individually controllable for deflecting an incident beam by predetermined amounts. In accordance with the deflection provided by the first stage, the beam is directed to a corresponding lens in the array from which it is directed onto the second deflector stage in such a way that the angular separation between the respective beams reaching the second stage is approximately equal to the full range deflection capability of the individual stages. The second stage, by virtue of being substantially identical to the first stage, then deflects the beam to one position of respective pluralities of positions as determined by the energization level of the second stage and the direction of the beam incident thereon. More specifically, in the case of a deflector apparatus comprising two 30-position deflector stages, for example, the lens array functions to receive the beam deflected by the first stage and direct it onto the second stage at one of 30 distinct directions angularly separated from one another by an amount substantially equal to the maximum deflection angle of the individual deflector stages. The second deflector stage then operates to direct the beam to one of a first group of 30 positions for a first direction of the incident beam from the lens array, to one of a second group of 30 positions for a second direction of the incident beam and so on for each angle of incidence of the beam reaching the second deflector stage, thereby filling in the voids produced by the lens array.

The lens array utilized in the present invention as opposed to the prior art prism array offers the advantage of reduced complexity since the lenses can be fabricated as a single molded structure in the form, for instance, of fly's eye or holographic lenses. Construction in this manner considerably simplifies fabrication of the deflector apparatus inasmuch as the necessity for precisely positioning individual prism elements is eliminated. In addition, the mode of operation is somewhat different in that the prisms refract the light so as to provide a wider angular separation between the beam directions derived from the first deflector stage whereas the lenses do not change the beam direction but instead focus the light to a smaller spot size while retaining the original separation between the discrete beam directions provided by the first deflector.

Other features of the invention relate to the provision of means for decreasing the path length from the first deflector stage to the lens array to effect a substantial reduction in the size of the apparatus and means for utilizing the full aperture of the second deflector stage to preserve the resolution of the device. These and other features of the invention will be understood more fully from a reading of the following detailed description of the preferred embodiment.

BRIEF DESCRIPTION OF THE DRAWING

The sole FIGURE is a side view schematic illustration of a deflector apparatus constructed according to the principles of the present invention.

DESCRIPTION OF THE PREFERRED EMBODIMENTS

Referring to the FIGURE, a first multi-position deflector stage 10, which may be of the electro-optic or other types as hereinbefore explained, comprises a horizontal deflector cell 11 and a vertical deflector cell 12 for providing two-dimensional deflection of the light beam 13 emitted from laser 14. Upon emerging from the first deflector stage, the light beam is focused by lens L1 to any one spot in a two-dimensional array of contiguous diffraction limited spots located at the image plane (I), the selected spot being determined in accordance with the angular deflection imparted to the beam by the first deflector stage. Lens L2 is a microscope objective positioned so that its front focal plane is coincident with the image plane and thereby functions to produce a magnified image of the resolvable spots at the magnified image plane (MI). Lens L3 changes the beam direction so that it is substantially parallel to the system axis 15 in order to strike the lens array 16 at normal incidence. The lens array includes a two-dimensional array of fly's eye lensiets each positioned to intercept the beam at a discrete angular deflection provided by the first deflector stage. Each lenslet of the array in turn focuses the beam incident thereon in a plane occupied by a low power, long focal length lens L4 which passes the individual beams without affecting their convergence (or divergence) but acts to change the direction of the respective beams so that they all enter a common portion of the second deflector stage 17 with the individual beams preferably covering substantially the full aperture (A) of the deflector to obtain maximum resolution. Lens L4 may be moved slightly along the system axis in one direction or the other to control the size of the beams entering the second deflector stage. The size of the focused spots provided by the lens array are made to be approximately thirty times smaller than the center to center distance between adjacent focal spot positions, for the case of a 30 × 30 deflector as previously referred to. This is achieved by virtue of the lenslets of the array functioning to focus the beams to a small spot size while retaining a spacing equal to that of the lenslets of the array. This satisfies the condition that the angle between the beams entering the second deflector must be 30 times the deflection range of the second deflector in order to address without overlapping. Lens L5 located in front of the second deflector stage collimates the diverging beam incident thereon from lens L4 preparatory to propagation through the deflector. Lens L6, positioned behind the second deflector, focuses the beams to resolvable positions in the near field for use in applications such as addressing of an optical memory. The second deflector stage consists of a horizontal deflector cell 18 and a vertical deflector cell 19 for deflecting the beam in two dimensions in the manner of the first deflector stage.

It will be readily apparent to those skilled in the art that lenses L1 and L5 may be positioned on the ends of the related deflectors opposite to that shown in the FIGURE. Likewise, lens L3 may be eliminated if the lenslets of the array are constructed to compensate for the spherical aberration attendant to beam direction skewed relative to the system axis. By the same token, lens L4 may be eliminated either individually or concurrently with lens L3 if the lenslets of the array are constructed to superimpose the beams at the second deflector as described above with reference to lens L4. The illustrated arrangement of the various components is preferred, however, because of the simplicity it affords in both design and fabrication particularly concerning the lens array in that all the lenslets may be identical since each one receives the light at normal incidence and focuses it into a common plane.

A simplified quantitative treatment of the various spacings and dimensions suitable for construction of an operational embodiment of the inventive apparatus will now be presented. First consider the magnitude of the spacing that would be required between the first deflector and the lens array in the absence of the microscope objective lens L2. A suitable starting point for designing the system can be based on a practically realizable lenslet diameter. Assume that this is equal to 0.1 centimeter, indicated as $d_{Ml}$ in the FIGURE. Using the diffraction equation which states that the minimum resolvable spot diameter $d = (2 \lambda f/A_d)$, where $\lambda$ is the light wavelength, $f$ the focal length of the lens and $A_D$ the diameter of the aperture from which the light emerges, and assuming an aperture diameter $A_D = 1$ cm at the first deflector stage or lens L1 and a light wavelength of $6 \times 10^{-5}$ centimeter along with $d = 0.1$ centimeter, the focal length can be calculated to be 830 centimeters.

The path length from the first deflector to the lens array is substantially shortened, however, by incorporating a microscopic lens L2 in the path. In this instance assume again that each lenslet has a diameter of 0.1 centimeter and further assume that the microscope objective lens L2 provides a magnification of 30. Then the spot size at the image plane (I) will be (0.1/30) = 0.0033 centimeter. Accordingly, for an aperture $A_D$ of 1 centimeter at the first deflector and a wavelength of $6 \times 10^{-5}$ centimeters, the focal length of lens L1 is determined from the above indicated diffraction equation to be:

$$f_{L1} = S \times A_D/2\lambda = 0.0033 \times 1/12 \times 10^{-5}) = 27.5 \text{ centimeters}$$

where S is the spot size at the image plane.

Also, for a lens L2 magnification of 30, if the focal length of lens L2, that is the spacing from the image plane (I) to the plane L2, is 1 centimeter, the spacing from lens L2 to lens L3 will be 30 centimeters thereby providing an overall spacing from the first deflector to the lens array of approximately 58.5 centimeters as compared to the 830 centimeter spacing obtained when the microsocope objective is not used. The choice of the microscope objective magnification is made to be equal to the number of desired resolvable beam positions. This provides for the characteristics of the second deflector stage to be the same as those of the first deflector stage insofar as resolution and aperture size are concerned.

The focal length of the lenslets in the fly's eye lens array is also determined by means of the diffraction equation. In order that 30 discrete positions of the second deflector may fill in the voids between the beams provided by the first deflector, the size of the spots focused in the plane of lens L4 must be one-thirtieth the size of the beam at the lenslets. Thus, the beam size (corresponding to the aperture diameter) of 0.1 centimeter must be reduced to a spot size ($d$) at lens L4 of (0.1/30) = 0.0033 centimeter. Then from the diffraction equation the focal length of the fly's eye lens is $$f_{FEL} = (d \times A_D/2\lambda) = (0.0033 \times 0.1/12 \times 10^{-5}) = 2.75 \text{ centimeters}$$

In addition, since the deflection angle of the second deflector must subtend a distance of 0.1 centimeter, the focal length of lenses L4 and L5 must be the same as lens L1 for the same resolution and aperture diameter $A_D$.

The foregoing simplified quantitative presentation is provided only for the purpose of illustrating one set of relative spacings and dimensions which will satisfy the required operating conditions. It wil be obvious to those skilled in the art that tradeoffs and compromises may be made with regard to the various dimensions and still realize the desired result.

While the invention has been described in its preferred embodiment, it will be understood that the words which have been used are words of description rather than limitation and that changes within the purview of the appended claims may be made without departing from the true scope and spirit of the invention in its broader aspects.

I claim:

1. The apparatus of claim 14 including third lens means positioned in or proximate said common focal plane of the lens array for directing light from each lens of the lens array onto a common portion of the second deflector stage.

2. The apparatus of claim 10 wherein the spacing from the lens array to the second deflector stage and the convergence of the light propagating from the lens array to said common focal plane of the lens array is such that the individual light beams entering the second deflector stage cover substantially the full aperture thereof.

3. The apparatus of claim 11 wherein the aperture of said first deflector stage is substantially equal to the aperture of said second deflector stage.

4. The apparatus of claim 12 including fourth lens means positioned between the lens array and said second deflector stage adjacent the latter for collimating the light transmitted to said second deflector stage.

5. Light deflector apparatus comprising
a first light deflector stage for controllably deflecting a light beam incident thereon along any of a plurality of discrete directions,
first lens means positioned proximate the deflector stage for focusing light output therefrom to an image plane such that each discrete direction of deflection corresponds to a respective resolvable position in the image plane,
a microscope objective lens positioned with the front focal plane thereof coincident with the image plane to direct light focused to each resolvable position in the image plane to a corresponding resolvable position in a magnified image plane,
a lens array having a plurality of lenses so constructed and arranged at the magnified image plane that an indivdiual lens is disposed at each resolvable position therein,
second lens means positioned imtermediate the microscope objective lens and the lens array proximate the latter for transmitting the light received from each resolvable position in the image plane onto the lens array at normal incidence,
each lens of the array being operative to focus the light normally incident thereon to discrete spaced positions in a common focal plane of the lens array such that the propagational axis of the light beam diverging from each spaced position has a discrete direction angularly separated from the propagational axis of the light beam from any other position in the common focal plane by an amount at least equal to the angular deflection range of the first deflector stage, and
a second light deflector stage having an angular deflection range substantially equal to the deflection range of said first deflector stage disposed to receive light from the lens array for controllably deflecting light propagated through any lens of the array to a discrete position of one of resepctive pluralities of discrete positions, corresponding to respective discrete angles of incidence of the light impinging on said additional deflector stage, in accordance with the angle of incidence of the light beam on the second deflector stage and the angular deflection imparted thereby to the incident light beam.

* * * * *

UNITED STATES PATENT OFFICE
CERTIFICATE OF CORRECTION

Patent No. 3,743,379                    Dated July 3, 1973

Inventor(s) Donald H. McMahon

It is certified that error appears in the above-identified patent and that said Letters Patent are hereby corrected as shown below:

Column 6, claim 1, line 1, "14" should read -- 5 --;

claim 2, line 1, "10" should read -- 1 --;

claim 3, line 1, "11" should read -- 2 --;

claim 4, line 1, "12" should read -- 3 --.

Signed and sealed this 14th day of May 1974.

(SEAL)
Attest:

EDWARD M. FLETCHER, JR.
Attesting Officer

C. MARSHALL DANN
Commissioner of Patents